United States Patent [19]

Schafer

[11] Patent Number: 4,915,433
[45] Date of Patent: Apr. 10, 1990

[54] COOKING LID LIFTING SUPPORT

[76] Inventor: Karoleen Schafer, 724 Ann Street, Birmingham, Mich. 48009

[21] Appl. No.: 229,010

[22] Filed: Aug. 5, 1988

[51] Int. Cl.[4] .............................................. A47J 45/00
[52] U.S. Cl. ..................................... 294/12; 294/27.1
[58] Field of Search .................. 294/12, 13, 9, 10, 11, 294/14, 6, 19.1, 24, 99.2, 2, 3, 27.1, 33, 26

[56] References Cited

U.S. PATENT DOCUMENTS

| | | | |
|---|---|---|---|
| 896,133 | 8/1908 | Mayer | 294/12 |
| 1,110,945 | 9/1914 | Kinsman | 294/99.2 |
| 1,134,905 | 4/1915 | Prochaska | 294/27.1 |
| 1,976,623 | 10/1934 | Monroe et al. | 294/33 |

FOREIGN PATENT DOCUMENTS

| | | | |
|---|---|---|---|
| 587396 | 11/1933 | Fed. Rep. of Germany | 294/27.1 |
| 933127 | 4/1948 | France | 294/27.1 |
| 1135563 | 4/1957 | France | 294/27.1 |
| 851254 | 10/1960 | United Kingdom | 294/27.1 |

Primary Examiner—Margaret A. Focarino
Assistant Examiner—Dean J. Kramer
Attorney, Agent, or Firm—Lynn E. Cargill

[57] ABSTRACT

A cooking lid lifting support made of a lid lifter, handle, and a clip for removably attaching to a handle or a knob of a cooking vessel lid and supporting the lid on the side of a cooking vessel. Attached to the lid lifter is a handle which is integral with and permanently attached to the lid lifter. The handle is shaped to be complementary to the shape of a hand for lifting the lid lifter. A clip is attached to the handle on the lid lifter and is integral with and permanently attached to the handle. The clip includes a portion for receiving the side of a cooking vessel, and acts as a holder for holding the lid lifter and the lid thereto in a desired relation to the side of the cooking vessel. During operation, the lid lifter holds the handle or knob of a lid, and the clip holds the lid lifter to the side of the vessel. The drippings collected on the inside of the lid are thereby returned into the pan when in proper position.

3 Claims, 1 Drawing Sheet

COOKING LID LIFTING SUPPORT

BACKGROUND OF THE INVENTION

During the process of cooking, many cooks have had a problem with the placement of the lid of a cooking vessel during the cooking process, for instance during stirring of the contents of pan. Most cooks take the lid and place it next to the vessel either on the stove or the counter adjacent to the coking area. In the past, other devices including pans and plates meant to receive a lid have been used on the stove or counter adjacent in order to place the lid and collect drippings which are dropped from the lid. Many sizes and shapes of these collection receptacles have been utilized, including racks, dishes, pans and the like.

It would be advantageous for a lid lifting support design to directly attach to the side of a cooking vessel being stirred to receive and hold the lid during that operation. It would further be an advantage to have a holder for the pan lid which would maintain the pan lid in a desired position such that the drippings from inside the pan lid would be returned back into the pan. It may also be used to advantage by handicapped persons as a aid to gripping, lifting and supporting a lid.

It is therefore a primary object of the present invention to provide a cooking lid lifting support which removably attaches to the top of a cooking vessel lid and positions the same on the side of a cooking vessel such that drippings from inside the lid are returned into the cooking vessel during its operation.

It is yet another object of the present invention to provide a cooking lid lifting support for gripping and removably attaching to the top of a cooking lid, thereby facilitating cooking by handicapped persons and other persons having trouble gripping a cooking lid.

SUMMARY OF THE INVENTION

In accordance with the present invention, a lifting support for a cooking vessel lid is provided which includes a lid lifter for removably attaching a handle or knob of a lid, a handle, and a clip. The lid lifter is designed for lifting and holding the cooking vessel lid. The handle is integral with and permanently attached to the lid lifter and is shaped to complement the shape of a human hand for easy lifting of the lid lifter once the lid is attached. Furthermore, the clip is attached to the handle portion for receiving the side of the cooking vessel, and acts as a holder for holding the lid lifter and the lid in a desired relation to the side of the vessel. The lifting support acts to hold the cooking lid in a position which is substantially perpendicular to the plane of the bottom of the cooking vessel, so that the drippings will return into the vessel when the lid is being held by the lifting support of the present invention. Moreover, an additional aspect of the invention includes an adjustable lid holder, handle and u-shaped clip. This combination may be used to attach many configurations of the lid to the side of a vessel while cooking.

DETAILED DESCRIPTION OF THE DRAWINGS

The present invention includes a cooking lid lifting support made of a bent wire, bent heat resistant plastic or ceramic composition which has a portion for attaching to and lifting the lid. The lid attachment is substantially circular having an opening on one end for receiving the handle or knob of the cooking vessel lid. The lid lifting support portion is constructed of a flexible bent material for securely holding the knob or handle of the cooking vessel lid by tension, thereby producing great stability when held in any position, regardless of whether the lid is inverted or vertical. The lid lifter is designed to support, hold and lift the vessel lid. The lid lifter also has a handle attached thereto which is intermediate between the lid lifter and the clip. The handle is preferably made of a material which will not transfer heat from the side of the cooking vessel to the handle, and is shaped complementary to the shape of a human hand. The handle is designed to be used for placing the lid lifter in position with respect to the handle or knob and is furthermore used to support the lid while attaching the clip to the side of the vessel. Handicapped persons may use the cooking lid lifting support of the present invention to their advantage because it gives them an aid in gripping a cooking lid.

Figure 1:
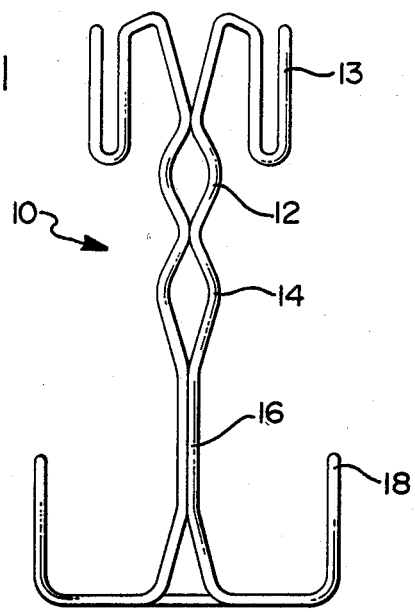
FIG. 1 is a top plan view of a cooking lid lifting support constructed in accordance with the present invention.

Turning now to the drawings, a cooking lid lifting support constructed in accordance with the present invention is illustrated in FIG. 1, and generally denoted by numeral 10. The lid lifter portion 12 is designed to be removably attached to a handle or knob of a cooking vessel, such as a pan, wok or other vessel. Lid lifter 10 may include varying sizes of attachment areas 12 and 14 for accommodating differing sizes of lid handles and/or knobs. Even though many sizes and shapes of cooking lid handles and/or knobs may be accommodated, all will be held securely with good stability by the present invention. Extensions 13 are included in the event the lid has a loop handle rather than a knob handle. A loop handle includes two points of contact and therefore needs to be lifted at two points, such as by extensions 13. The lid lifter is designed to support and lift the cooking vessel lid. A handle 16 is integral with and permanently attached to lid lifter attachment areas 12 and 14 and is shaped complementary to the shape of a human hand for lifting. A clip 18 which is also integral with and permanently attached to the handle includes a portion for receiving the side of the cooking vessel. Clip 18 may act as a holder for holding lid lifter 10 and the cooking vessel lid in a desired relation on the side of the cooking vessel. Although this preferred embodiment illustrates a u-shaped clip, other designs are contemplated by the invention.

Figure 2:
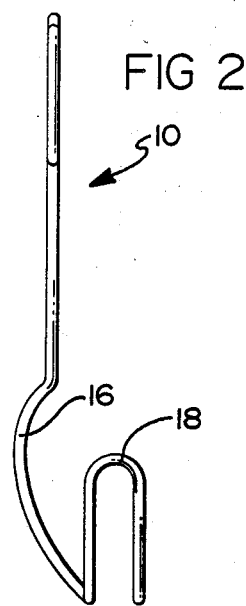
FIG. 2 is a side view of the cooking lid lifting support.
Figure 3:
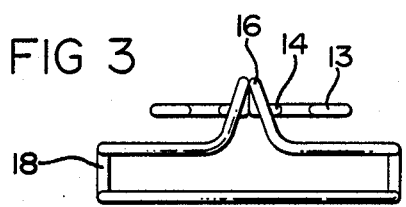
FIG. 3 is a bottom view of the cooking lid lifting support showing the related spacing of the various components.

With reference to FIG. 2, a side view of the present invention is illustrated which shows the relative positioning of handle 16 and clip 18. FIG. 3 illustrates the bottom view of the present invention and shows the relative placement of the u-shaped clip.

Figure 4:
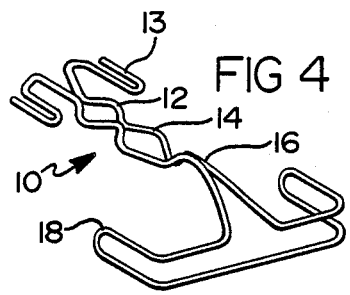
FIG. 4 is a perspective view of the cooking lid lifting support.

FIG. 4 is a perspective view of the cooking lid lifting support of the present invention more clearly showing the deep, u-shaped clip 18 which is designed to be placed over the side of a cooking vessel. Handle 16 is attached intermediate the lid lifter attachment areas 12 and 14 and clip 18.

Figure 5:
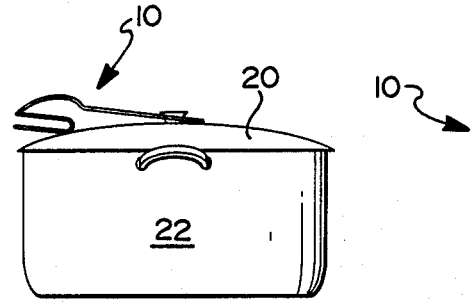
FIG. 5 is a side view of the cooking lid lifting support shown in operation when attached to the knob of a pan lid.
Figure 6:
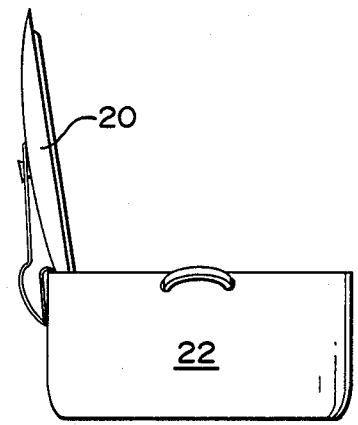
FIG. 6 illustrates the cooking lid lifting support in operation holding the pan lid while being attached to the side of the pan. While the invention will be described in connection with a preferred embodiment, it will be understood that it is not intended to limit the invention to that embodiment. On the contrary, it is intended to cover many alternatives including the use of a handle or knob or any other top of a cooking vessel lid. Further modifications and equivalents as may be included within the spirit scope of the invention are defined by the appended claims.

FIG. 5 illustrates the cooking lid lifting support while in operation as removably attached to a knob on the top of a pan lid of a conventional cooking pan. FIG. 6 shows the placement of lid lifting support 10 while holding the pan lid in a substantially perpendicular position relative to the plane of the bottom of the pan. The drippings from the inside of the pan lid will return into the pan while stirring or performing other cooking operations. The present invention is also concerned with providing a lid lifter for use on any cooking vessel, such as a wok any other cooking vessel having a side and a lid with a handle or a knob. In keeping with the invention, the lid lifter portion may include clips to hold a handle rather than a knob which may be attached to a cooking lid.

The cooking lid lifting support may be formed of a wire bent into the desired shape, or may be made of a heat-resistant plastic or a pliable ceramic material. In a first preferred embodiment, the lid lifter portion comprises openings of a substantially circular shape having an opening in at least one end for receiving the knob or handle of a pan lid. The lid lifter may include many different varying sizes or shapes. For instance, the lid lifter as illustrated in FIG. 1 may furthermore include a clip attached to the uppermost end of the device above lid lifter attachment areas 12 and 14 which is designed to clip onto a loop type handle on the cooking lid.

While many different designs for attaching to the lid of a cooking vessel are not explicitly called for in the present disclosure, it is within the realm of the invention for anyone of ordinary skill in the art to design a specific means for removably attaching the lid lifter to the top of a specific cooking vessel. It is the primary aim of the present invention to provide a lid lifter which is removably attachable to the top of a cooking lid, a handle and a clip which is attached thereto for clipping the entire assembly to the side of the cooking vessel such that the drippings return back into the cooking vessel during operation.

Thus, it is apparent that there has been provided, in accordance with the invention, a cooking lid lifting support that fully satisfies the objects, aims, and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as shall fall within the spirit and broad scope of the appended claims.

I claim:

1. A cooking lid lifting support for a cooking vessel lid, comprising:
    a lid lifter portion made of a bent wire-like assembly designed of substantially circular openings for straddling and removably attaching and accommodating varying sizes and shapes of handles of a cooking vessel lid, said lid lifter portion being designed for securely supporting and lifting a lid having a handle on its top;
    a deep, U-shaped clip designed for clipping onto the side of the cooking vessel, said clip acting as a holder for holding the lid lifting support and the lid in a desired relation on the side of the cooking vessel, thereby imparting, stability to the lid lifting support while holding the lid in position on the side of the cooking vessel; and
    a handle located intermediate the lid lifter portion and the clip, said handle being integral with and permanently attached to both the lid lifter portion and the clip, and said handle further being shaped to be complementary to the shape of a human hand for lifting the lid and for placing the clip on the side of the cooking vessel, and lifting support being designed so that the lid after portion holds the cooking vessel lid in such a fashion that when clipped to the side of the cooking vessel, the drippings on the inside surface of the lid drip and return into the cooking vessel.

2. A lifting support as in claim 1, wherein said lifting support is made of a metal wire.

3. A lifting support as in claim 1, wherein said lifting support is made of a heat-resistant plastic material.

* * * * *